United States Patent [19]

Maruoka et al.

[11] 4,327,409
[45] Apr. 27, 1982

[54] CONTROL SYSTEM FOR INPUT/OUTPUT APPARATUS

[75] Inventors: Minekazu Maruoka; Tatsushi Hirotani, both of Kawasaki, Japan

[73] Assignee: Fujitsu Limited, Kawasaki, Japan

[21] Appl. No.: 71,084

[22] Filed: Aug. 31, 1979

[30] Foreign Application Priority Data

Sep. 8, 1978 [JP] Japan ................. 53-110508

[51] Int. Cl.³ .............................................. G06F 3/00
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 3,593,299 | 7/1971 | Driscoll et al. | 364/200 |
| 3,815,099 | 6/1974 | Cohen et al. | 364/200 |
| 4,090,239 | 5/1978 | Twibell et al. | 364/200 |
| 4,099,255 | 7/1978 | Stanley et al. | 364/200 |
| 4,103,328 | 7/1978 | Dalmasso | 364/200 |

*Primary Examiner*—Harvey E. Springborn
*Assistant Examiner*—John Gladstone Mills
*Attorney, Agent, or Firm*—Staas & Halsey

[57] ABSTRACT

A control system for a plurality of I/O apparatuses used for transferring data between a main memory and an I/O apparatus controlling device through a channel control device. If an error occurs in the data transfer, no response signal is sent to the I/O apparatus controlling device from the channel control device and the absence of the response signal is detected by time supervision in the supervising circuit in the I/O apparatus controlling device, so that only the portion of the I/O apparatus related to the error is stopped.

7 Claims, 5 Drawing Figures

| Fig. 4A | Fig. 4B |

CONTROL SYSTEM FOR INPUT/OUTPUT APPARATUS

BACKGROUND OF THE INVENTION

1. Field of the Invention

The present invention relates to a control system for a plurality of input/output apparatuses (I/O apparatuses) in an electronic computer system, and more particularly to a control system for an I/O apparatus which is capable of dealing with the problem of an erroneous transfer of data between the main memory and the I/O apparatus controlling device.

2. Description of the Prior Art

Control systems for a plurality of I/O apparatuses in accordance with the prior art are illustrated in FIGS. 1 and 2 attached to the present specification. In FIG. 1, an electronic computer system comprising a central control unit 2, a main memory 1, a channel control device 3, I/O apparatus controlling devices 51, 52, . . . , 5n, and, I/O apparatuses 61, 62, . . . , 6n. I/O apparatus controlling devices 51, 52, . . . , 5n are connected to a common bus 4 to the channel control device 3. Each of the I/O apparatus controlling devices 51, 52, . . . , 5n includes a bus supervising circuit 51A, 52A, . . . , 5nA. The main memory 1 permits access from either the central control unit 2 or the channel control device 3. The channel control device 3 exchanges information with the I/O apparatus controlling devices 51, 52, . . . , 5n by way of the common bus interface control through the common bus 4, and accordingly controls the corresponding I/O apparatuses 61, 62, . . . , and 6n. The I/O apparatuses 61, 62, . . . , 6n effect the data transmission with the central control unit 1 through the I/O apparatus controlling devices 51, 52, . . . , 5n and the channel control device 3 in accordance with the start sequence instruction from the central control unit 2.

The operation of the system shown in FIG. 1 is illustrated by the information flow chart of FIG. 2. At first, at the stage of the Execution of Instruction signal (a), the central control unit 2 sends an Instruction of Start signal (b) and an I/O Address Information signal (c) which indicates the selected I/O apparatus which is to be controlled, to the channel control device 3. In accordance with the Instruction of Start signal (b) and the I/O Address Information signal (c), the channel control device 3 sends a Request for Control Information signal (d) to the main memory 1, and accordingly a Control Information signal (e) is sent to the channel control device 3. In accordance with the I/O Address Information signal (c), the Control Information signal (e) is sent to the corresponding I/O apparatus controlling device 51, 52, . . . or 5n so that the I/O apparatus corresponding to the I/O apparatus controlling device is actuated.

Assume that the Control Information signal (e) is an instruction to transfer data from one of the I/O apparatuses 61, 62 . . . 6n to the main memory 1. In accordance with the Control Information signal (e), a Request for Transfer signal (g), (g') and Data signal (h), (h') are sent from one of the the I/O apparatus controlling devices 51, 52, . . . , 5n to the main memory 1. If the Data signal (h), (h') is correctly received by the main memory 1, a Main Memory Response signal (i) is sent from the main memory 1 to the channel control device 3, and accordingly a Response signal (j) is sent from the channel control device 3 to one of the I/O apparatus controlling devices 51, 52 . . . 5n. After that the control proceeds to the next step.

On the other hand, if some errors, such as an incorrect receipt of the Data signal (h), (h') in the main memory 1 or a detection of erroneous data transfer by the channel control device 3, occur in the data transfer between the I/O apparatuses 61, 62 . . . 6n and the main memory 1, the following process will take place. That is, the channel coontrol device 3 sends a Reset signal (s), instead of a Response signal (j), to the I/O apparatus controlling devices 51, 52 . . . 5n, in accordance with either a Main Memory Response signal (i) indicating the error from the main memory 1 or an error detection signal by the channel control device 3 itself. Thus, all of the operating I/O apparatuses 61, 62 . . . 6n connected to the I/O apparatus controlling devices 51, 52 . . . 5n are caused to be reset and stopped. Simultaneously with the stopping of the I/O apparatus controlling devices 51, 52 . . . 5n, the channel control device 3 notifies the central control unit 2 of the occurrence of the error by sending a Request for Interruption signal (p). A Request for Memory Access signal (g) is sent from the channel control device 3 to the main memory 1 so that an Error Information signal (r) is written into a specific address in the main memory 1. The above mentioned Request for Transfer signal (g), (g') includes only the address of the main memory 1 and the data which is to be stored in the main memory 1 or to be read out from the main memory 1 and does not include the address of any of the I/O apparatuses 61, 62 . . . 6n. It is not necessary to know the address of the I/O apparatus 61, 62 . . . 6n, because the channel control device 3 and the I/O apparatus controlling device 51, 52 . . . 5n corresponding to the I/O apparatus 61, 62 . . . 6n which is effecting the transfer is specifically connected through the common bus 4. Accordingly, the above mentioned Error Information signal (r) is only an information signal detected in the channel control device 3 and does not include the address of the I/O apparatus 61, 62 . . . 6n related to the error. Then, the central control unit 2 reads out the information stored in the specific address in the main memory 1 in accordance with the Error Information signal (r) and effects the predetermined error disposing process.

In the control systems for I/O apparatuses 61, 62, . . . 6n in accordance with the prior art as described above, although it is possible to confirm the type of errors which have occurred by way of the error information signal detected by the channel control device 3, the interruption from the side of the I/O apparatus 61, 62 . . . 6n does not take place except in the case where the transfer operation at the I/O apparatus 61, 62 . . . 6n side is informed when the information transfer from the main memory 1 to the I/O apparatus 61, 62 . . . 6n is normally completed and the case where the detection of an error is informed when the error is detected by the I/O apparatus controlling devices 51, 52 . . . 5n. It should be noted that the address information of the I/O apparatus 61, 62 . . . 6n is delivered to the common bus 4 when an interruption takes place with regard to the I/O apparatuses 61, 62 . . . 6n. Thus, the address of the I/O apparatus 61, 62 . . . 6n is communicated to the channel control device 3 due to the interruption in the common bus 4 by the I/O apparatus controlling devices 51, 52 . . . 5n. Accordingly, the address of the I/O apparatus 61, 62 . . . 6n in question is discovered. Therefore, in the common bus interface control system, the address of the I/O apparatus 61, 62 . . . 6n cannot be known to the channel control device 3 when an error occurs in the transfer between said I/O apparatus 61, 62 . . . 6n and the main memory 1, except for the above described two cases. As a result, the above mentioned Reset signal (s) resets all of the I/O apparatuses 61, 62, . . . , 6n under the common bus interface control between the channel control device 3 and the I/O apparatus controlling devices 51, 52 . . . 5n so that all of the I/O apparatuses 61, 62, . . . , 6n are brought back to their initial status and stopped. This operation is considered unfavorable, because even the I/O apparatuses 61, 62 . . . 6n which need not be stopped are caused to be stopped. In addition, since it is required that the central control unit 2 confirm the operation status of all I/O apparatuses 61, 62 . . . 6n by reading out the information registered in the registers for all I/O apparatuses 61, 62 . . . 6n connected to the channel control device 3 which delivers the error information signal and effects a re-start of the stopped operation or repetition of the whole process from the beginning, the amount of information to be disposed becomes very large. This increase of the amount of information is also considered unfavorable, because it places a heavy burden on the central control unit 2.

The present invention has been proposed in order to provide a solution to the above explained problems in the prior art system.

The above explained prior art system is disclosed in, for example, U.S. Pat. Nos. 3,710,324 and 3,815,099.

SUMMARY OF THE INVENTION

It is the principal object of the present invention to stop only those I/O apparatuses which are related to the erroneous operation without stopping any I/O apparatuses which are in normal operation, to effect the appropriate re-start of the stopped I/O apparatuses, and to prevent the increase in information to be disposed in the central control unit due to the stopping and the subsequent re-starting of the I/O apparatuses.

DESCRIPTION OF THE PREFERRED EMBODIMENT

Figure 1:
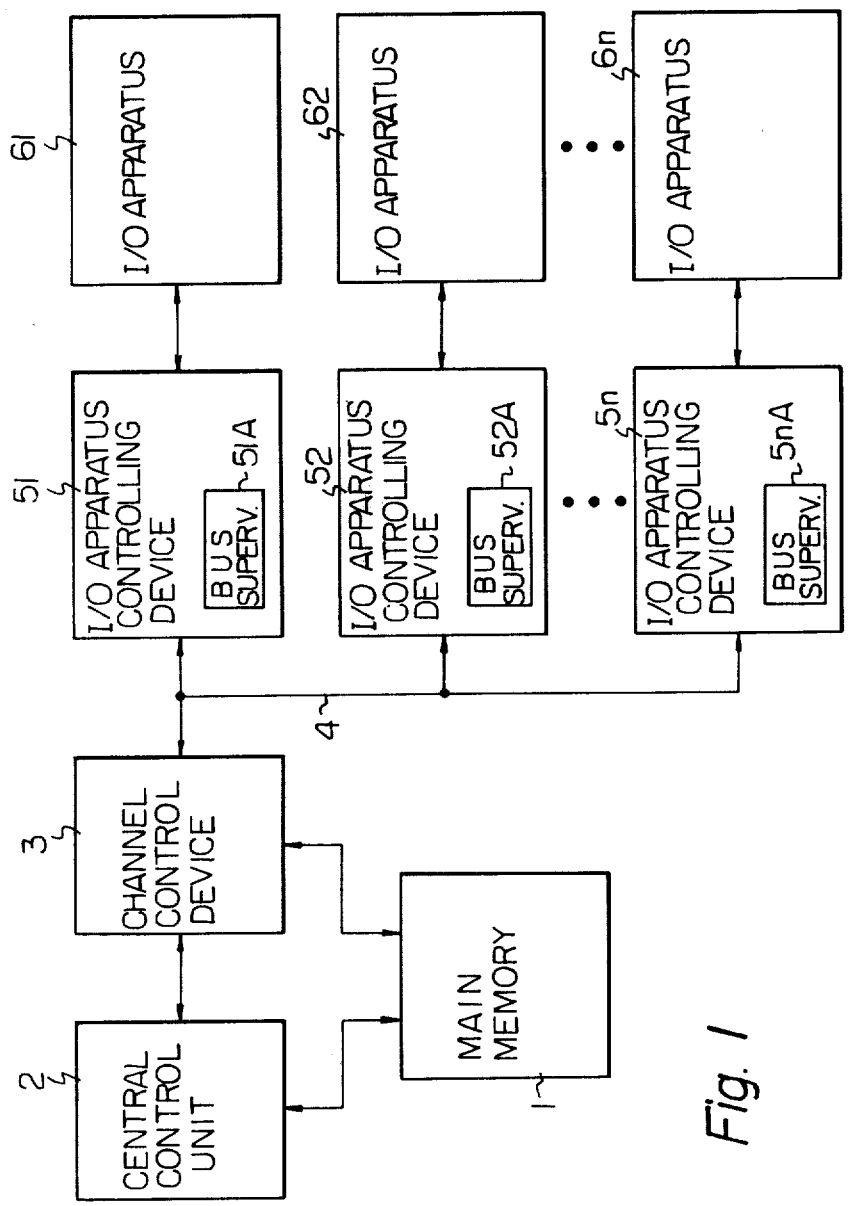
FIG. 1 illustrates an electronic computer system to which the control system for I/O apparatuses in accordance with an embodiment of the present invention is applied, and also illustrates an electronic computer system to which the prior art control system for I/O apparatus is applied.

The operation of the control system for the I/O apparatus in accordance with the present invention applied to the electronic computer system shown in FIG. 1 will be hereinafter explained with reference to the information flow chart illustrated in FIG. 3.

Figure 2:
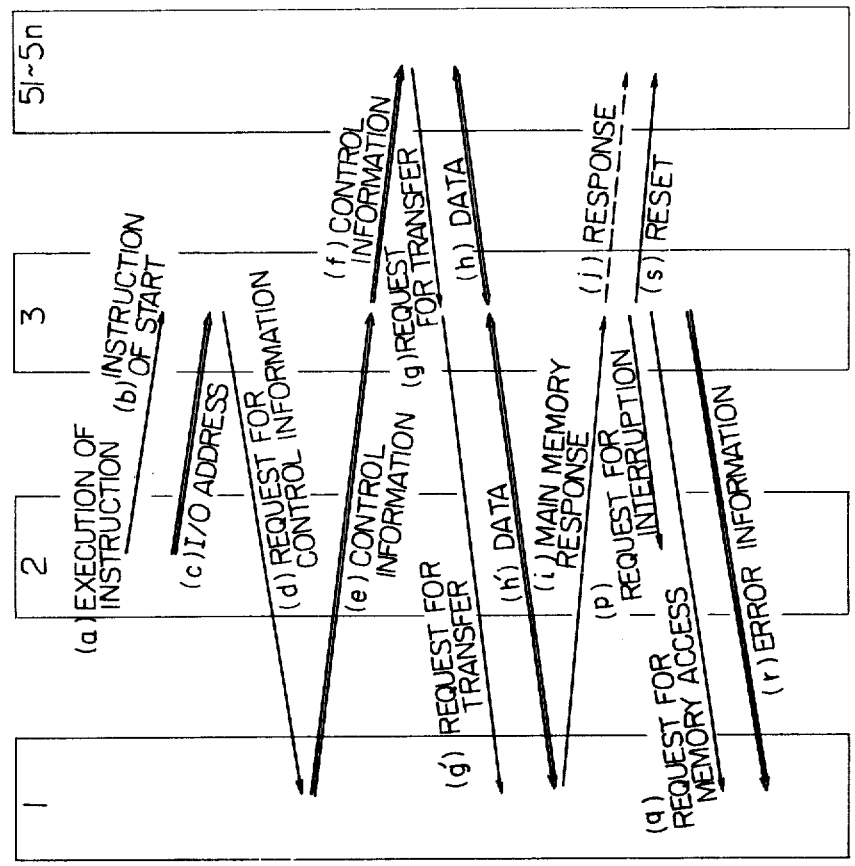
FIG. 2 illustrates the information flow chart of the prior art control system for the I/O apparatus shown in FIG. 1.

The steps from the Execution of Instruction signal (a) to the Response signal (j), with the assumption that the Control Information signal (e) is an instruction to transfer data from the I/O apparatus to the main memory and the Data signal (h), (h'), is correctly received by the main memory, are the same as described above regarding the prior art system with reference to FIG. 2.

Figure 3:
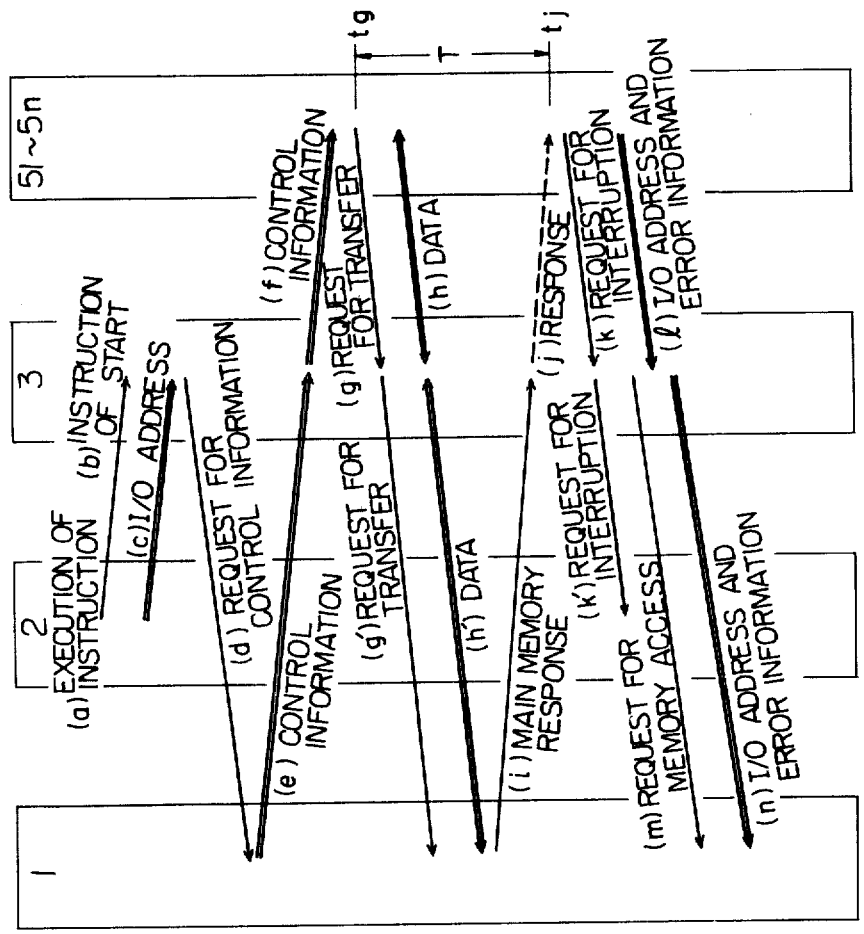
FIG. 3 illustrates an information flow chart for the control system for the I/O apparatuses in accordance with an embodiment of the present invention.

In FIG. 3, if some errors, such as an incorrect receipt of the Data signal (h), (h') in the main memory or a detection of an erroneous data transfer by the channel control device, occur in the data transfer between one of the I/O apparatuses and the main memory, no Response signal (j) is sent from the channel control device to the I/O apparatus controlling device. In this case, the supervision for the time interval T from the moment tg of the delivery of Request for Transfer signal (g) to the moment tj of the receipt of Response signal (j) is effected by the bus supervising circuits 51A, 52A, . . . , 5nA provided in the I/O apparatus controlling devices 51, 52 . . . 5n, respectively. A limit value $T_o$ of the time T is predetermined. If the time T exceeds $T_o$ without any Response signal (j) being received due to an error in the data transfer, a time-out signal is generated. Upon generation of the time-out signal, a Request for Interruption signal (k) and an I/O Address and Error Information signal (l) are sent from the I/O apparatus controlling device to the channel control device. Only the I/O apparatuses which are affected by the error are stopped in accordance with the address information of the error affected I/O apparatuses. A Request for Interruption signal (k') is sent from the channel control device to the central control unit so that the central control unit is informed of the occurrence of the error, and a Request for Memory Access signal (m) is sent from the channel control device to the main memory. Thus, an I/O Address and Error Information signal (n), including an I/O Address and Error Information signal of the I/O apparatus affected by the error sent from the I/O apparatus controlling device and an Error Information signal detected in the channel control device 3, is written into a specific address in the main memory 1. Then the central control unit 2 recognizes the occurrence of the error due to the Request for Interruption signal (k') and reads-out the information stored in the specific address in the main memory 1. In accordance with the read-out information, the central control unit 2 recognizes the address of the I/O apparatus affected by the error and the information regarding the type of the error. Accordingly, the necessary steps are taken by the central control unit 2 with the address and information.

Figures 4, 4A:
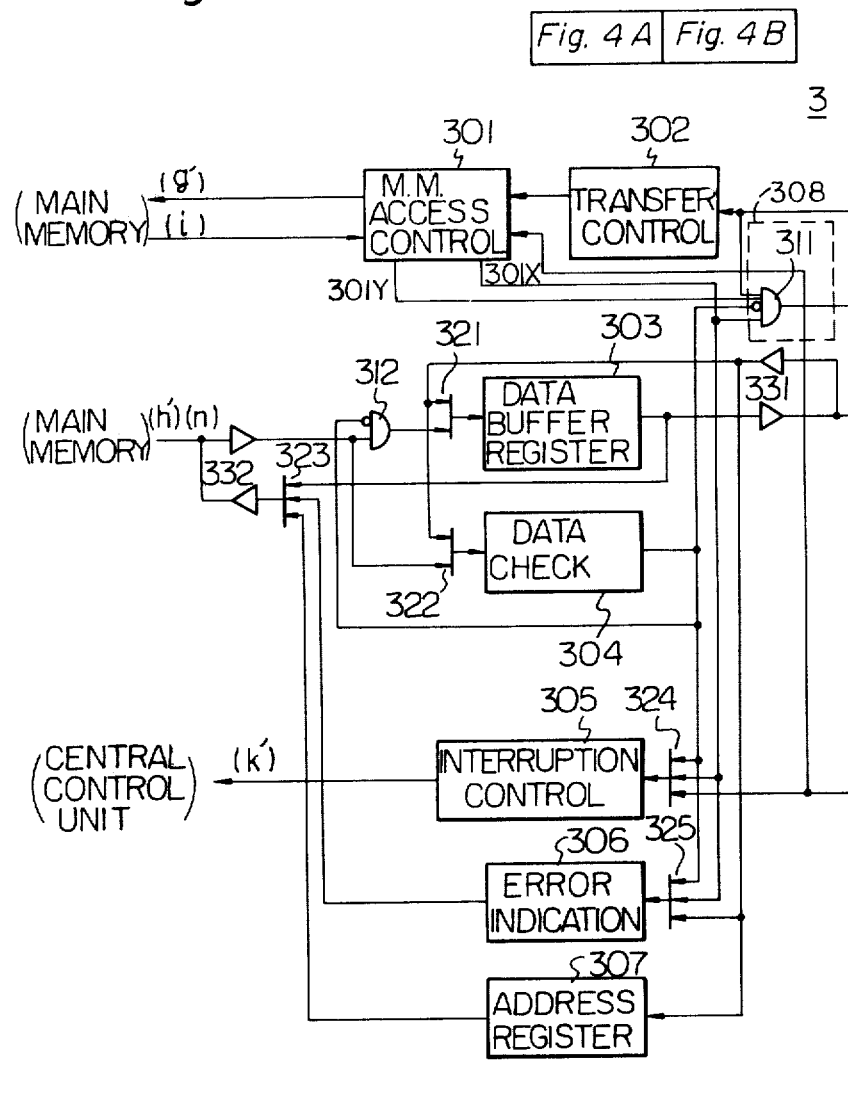
FIG. 4 (comprised of 4A and 4B) illustrates the detailed circuit diagram for the control system for I/O apparatuses for realizing the operation illustrated by the flow chart in FIG. 3.
Figure 4B:
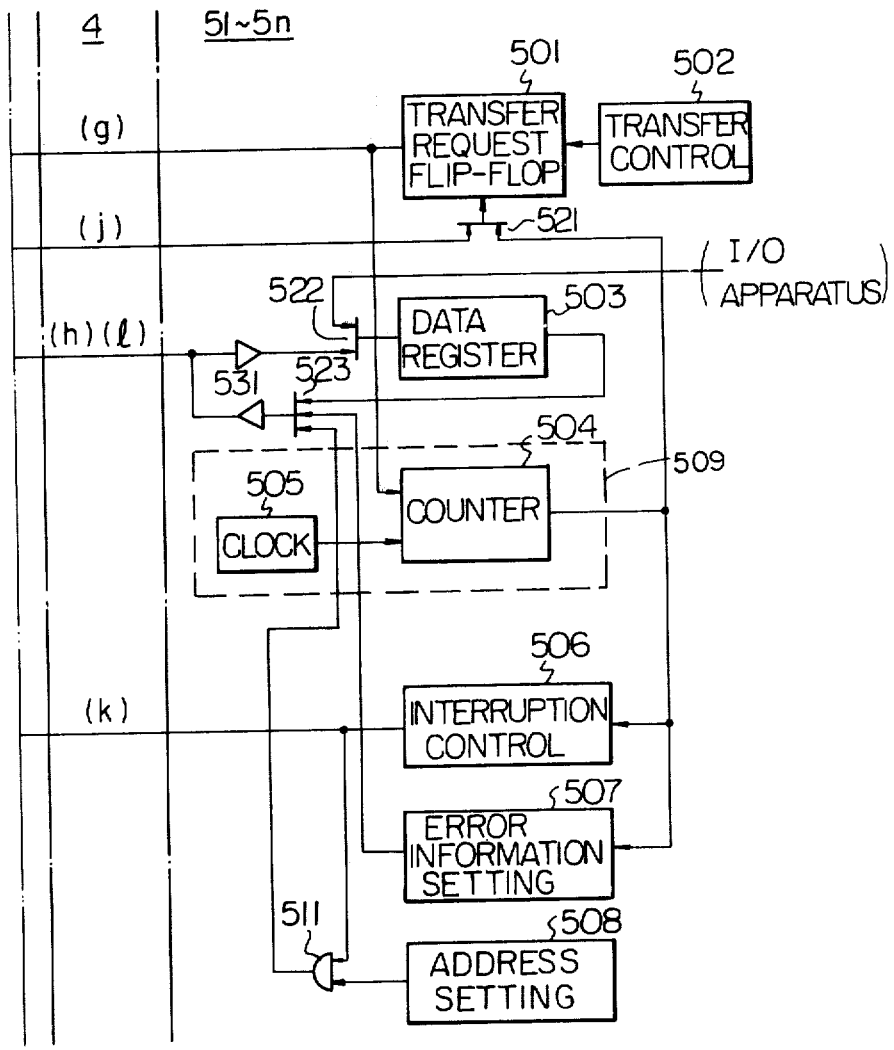

In FIG. 4, an example of the detailed circuit diagram of the control system for the I/O apparatus for realizing the operation shown in FIG. 3 is illustrated.

The following are the elements of the channel control device 3: the main memory access control circuit 301, the transfer control circuit 302, the data buffer register 303, the data check circuit 304, the interruption control circuit 305, the error indication circuit 306, the address register circuit 307, a response signal control circuit 308 including an AND gate 311 for providing a response signal, the AND gate 312, the OR gates 321, 322, 323, 324, 325 and the driver-receivers 331, 332. The following are the elements of the I/O apparatus controlling devices 51, 52 . . . 5n: the transfer request flip-flop circuit 501, the transfer control circuit 502, the data register 503, the bus supervising circuit 509 (corresponding to 51A, 52A, . . . 5nA in FIG. 1) including the counter circuit 504 and the clock pulse generation circuit 505, the interruption control circuit 506, the error information setting circuit 507, the address setting circuit 508, the AND gate 511, the OR gates 521, 522, 523 and the driver-receiver 531. The counter circuit 504 and the clock pulse generation circuit 505 correspond to the bus supervising circuit in the I/O apparatus controlling device in FIG. 1.

The operation of the system shown in FIG. 4 is as follows. Assume that the Control Information signal (e) (FIG. 3) contains information instructing the transfer of data from the I/O apparatus to the main memory. In accordance with the Control Information signal (e) (FIG. 3), the Request for Transfer signal (g) is sent from the transfer request flip-flop circuit 501 to the channel control device 3, and the Data (h) is sent from the data signal register 503 to the channel control device 3 through the OR gate 523 and the driver-receiver 531. In accordance with the Request for Transfer signal (g), the transfer control circuit 302 is started and the Data signal (h) is registered in the data buffer register 303. When the main memory access control circuit 301 is started, the Request for Transfer signal (g') is sent from the main memory access control circuit 301 to the main memory and the Data signal (h') is sent from the data buffer register 303 to the main memory.

If the Data (h') is correctly received by the main memory, the Main Memory Response signal (i) is sent from the main memory to the main memory access control circuit 301. Then, since the AND gate 311 produces the output signal, the output signal representing Response signal (j) is sent to the I/O apparatus controlling devices 51, 52 . . . 5n.

If some errors occur in the data transfer between the I/O apparatus and the main memory, that is if either the DATA signal (h') is incorrectly received by the main memory and no Main Memory Response signal (i) is delivered, or if the data check circuit 304 in the channel control circuit detects the data error, no output signal is produced by the AND gate 311 and accordingly no Response signal (j) is sent to the I/O apparatus controlling devices 51, 52 . . . 5n. To this end, the main memory access control circuit 301 provides the main memory response signal as an error detection signal 301X and a timing signal 301Y. When no Response signal (j) is generated, a time-out signal is produced from the counter circuit 504 where the time interval from the delivery of the Request for Transfer signal (g) to the receipt of the Response signal (j) is supervised. In accordance with the time-out signal, the transfer request flip-flop circuit 501 is reset, and the interruption control circuit 506 and the error information setting circuit 507 are operated, so that the Request for Interruption signal (k) and the I/O Address and Error Information signal (l) are sent to the channel control device.

In accordance with the Request for Interruption signal (k), the interruption control circuit 305 is started so that the Request for Interruption signal (k') is sent to the central control unit. At the same time, the information delivered from the error indication circuit 306 and the address register circuit 307 are sent to the specific address in the main memory due to the main memory access by the main memory access control circuit 301. Accordingly, the central control unit is able to recognize the address of the I/O apparatus which is affected by the error and the information regarding the type of error by reading-out the information stored in the specific address in the main memory.

What is claimed is:

1. A control system, for a plurality of I/O apparatuses, comprising:
   a central control unit for generating an instruction signal;
   a channel control device, operatively connected to said central control unit, for receiving said instruction signal, for providing a control information signal, a response signal, a request for transfer signal, a data signal, a request for memory access signal and an I/O address and error information signal, and for providing a request for interruption signal to said central control unit;
   a main memory circuit, operatively connected to said central control unit and said channel control device, for receiving said request for memory access signal, said I/O address and error information signal, said request for transfer signal, and said data signal from said channel control device, and for providing said control information signal and a main memory response signal to said channel control device;
   a common bus operatively connected to said channel control device;
   a plurality of I/O apparatus controlling devices, operatively connected to said common bus, for receiving said control information signal and said response signal from said channel control device via said common bus, and for providing said request for transfer signal, said data signal, said request for interruption signal, and said I/O address and error information signal to said channel control device via said common bus,
   each of the plurality of I/O apparatuses being operatively connected to one of said plurality of I/O apparatus controlling devices,
   said plurality of I/O apparatus controlling devices controlling the plurality of I/O apparatuses in dependence upon said control information signal and said response signal provided by said channel control device to said plurality of I/O apparatus controlling devices, via said common bus,
   each of said plurality of I/O apparatus controlling devices comprising supervising means for measuring the time between generation of said request for transfer signal and receipt of said response signal by the I/O apparatus controlling device, said supervising means including means for generating a time-out signal when the measured time exceeds a predetermined time, so that when data transfer between said main memory circuit and one of the plurality of I/O apparatuses, through said channel control device, said common bus and a corresponding one of said plurality of I/O apparatus controlling devices, is normal, said response signal is sent from said channel control device to the corresponding one of said plurality of I/O apparatus controlling devices, and when errors occur in data transfer between said main memory circuit and the one of the plurality of I/O apparatuses, through said channel control device, said common bus, and the corresponding one of said plurality of I/O apparatus controlling devices, no response signal is sent from said channel control device to the corresponding one of said plurality of I/O apparatus controlling devices affected by the error, the absence of said response signal being detected by said supervising means, and only the one of the plurality of I/O apparatuses involved in the erroneous data transfer is stopped,
   said I/O address and error information signal being sent to the main memory circuit via the corresponding one of said plurality of I/O apparatus controlling devices, said common bus and said channel control device, said I/O address and error information signal identifying the one of the plurality of I/O apparatuses involved in the erroneous data transfer, said request for interruption signal being sent to said central control unit via the corresponding one of said plurality of I/O apparatus controlling devices, said common bus, and said channel control device.

2. A control system as set forth in claim 1, wherein said channel control device comprises:

a main memory access control circuit, operatively connected to said main memory circuit, for providing said request for transfer signal to said main memory circuit and for receiving and providing said main memory response signal;

a transfer control circuit, operatively connected to said main memory access control circuit and said common bus, for receiving and outputting said request for transfer signal;

gate means, operatively connected to said main memory access control circuit and said common bus, for receiving said main memory response signal and said request for transfer signal, and for providing, as an output on said common bus, said response signal;

a data buffer register, operatively connected to said common bus and said main memory circuit, for receiving and outputting said data signal;

a data check circuit, operatively connected to said data buffer register circuit and said gate means, for detecting a data error and for generating an error signal;

a channel interruption control circuit, operatively connected to said central control unit and said common bus, for receiving and outputting said request for interruption signal; and an address register circuit, operatively connected to said common bus and said main memory circuit, for receiving and outputting said I/O address and error information signal.

3. A control system as set forth in claim 1 or 2, wherein each of said plurality of I/O apparatus controlling devices comprises:

a transfer request flip-flop, operatively connected to said common bus and to said supervising means, for receiving said control information signal, said time-out signal, and said response signal, and for generating said request for transfer signal in dependence upon said control information signal and said time-out signal;

a data register circuit, operatively connected to said common bus and to one of the plurality of I/O apparatuses, for providing said data signal;

an I/O interruption control circuit, operatively connected to said common bus and said supervising means, for generating said request for interruption signal in dependence upon said time-out signal;

an error information and address setting circuit, operatively connected to said common bus and to said supervising means, for generating said I/O address and error information signal in dependence upon said time-out signal.

4. A control system as set forth in claim 3, wherein said supervising means comprises a clock circuit for generating a clock signal, and a counter circuit, operatively connected to said transfer request flip-flop and said clock circuit, for receiving said request for transfer signal and said clock signal and for generating said time-out signal when errors occur in data transfer between said main memory circuit and the one of the plurality of I/O apparatuses.

5. A control system for a plurality of I/O apparatuses, comprising:

a main memory circuit;

a central control unit, operatively connected to said main memory circuit, for providing an instruction signal;

a common bus;

a channel control device, operatively connected to said central control unit, said main memory circuit, and said common bus, for providing a control information signal and a response signal on said common bus, said main memory circuit being acessed by either said central control unit or said channel control device;

a plurality of I/O apparatus controlling devices operatively connected to said common bus, each of the plurality of I/O apparatuses being operatively connected to one of said plurality of I/O apparatus controlling devices, said plurality of I/O apparatus controlling devices controlling the plurality of I/O apparatuses by means of the common bus interface control between said channel control device and said plurality of I/O apparatus controlling devices, in dependence upon said control information signal, each of said plurality of I/O apparatus controlling devices comprising:

a transfer request flip-flop circuit, operatively connected to said common bus, for providing a request for transfer signal on said common bus, and for receiving said response signal;

a data register, operatively connected to said common bus and to one of the plurality of I/O apparatuses, for providing a data signal on said common bus;

a bus supervising circuit, operatively connected to said transfer request flip-flop circuit, for providing a time-out signal to said transfer request flip-flop circuit;

a first interruption control circuit, operatively connected to said common bus and said bus supervising circuit, for providing a request for interruption signal on said common bus in dependence upon said time-out signal; and an error information and address setting circuit, operatively connected to said common bus and to said bus supervising circuit, for providing an I/O address and error information signal for identifying one of the plurality of I/O apparatuses in dependence upon said time-out signal, said channel control device comprising:

a main memory access control circuit, operatively connected to said main memory circuit, for providing said request for transfer signal to said main memory circuit, and for receiving and providing said main memory response signal;

a transfer control circuit, operatively connected to said main memory access control circuit and said common bus, for receiving and outputting said request for transfer signal;

a data buffer register, operatively connected to said common bus and said main memory circuit, for receiving and outputting in said data signal;

a data check circuit, operatively connected to said data buffer register circuit, for detecting a data error;

a second interruption control circuit, operatively connected to said central control unit and said common bus, for receiving and outputting said request for interruption signal;

error indication and address register means, operatively connected to said common bus and said main memory circuit, for receiving and outputting said I/O address and error information signal;

a response signal control circuit, operatively connected to said main memory access control circuit and said data check circuit, for determining the occurrence of an error in data transfer and for selectively providing a response signal on said common bus or placing said channel control device in an idle state, in dependence upon whether an error in data transfer has occurred;

said bus supervising circuit measuring the time duration from the generation of said request for transfer signal to the receipt of said response signal, so that if the time duration exceeds a predetermined time interval said time-out signal is generated, the I/O apparatus in which an error has occured is identified, and the operation of the identified I/O apparatus is stopped.

6. The system as set forth in claim 5, wherein said response signal control circuit comprises an AND gate having inputs connected to said transfer control circuit, said main memory access control circuit, and said data check circuit, and having an output for providing said response signal on said common bus.

7. The system as set forth in claim 5 or 6, wherein said bus supervising circuit comprises means for generating a clock pulse signal, and a counter circuit, operatively connected to receive the clock pulse signal, operatively connected to said common bus for receiving said request for transfer signal, and operatively connected for providing said time-out signal to said transfer request flip-flop circuit.

* * * * *

UNITED STATES PATENT AND TRADEMARK OFFICE
CERTIFICATE OF CORRECTION

PATENT NO. : 4,327,409
DATED : APRIL 27, 1982
INVENTOR(S) : MINEKAZU MARUOKA ET AL.

It is certified that error appears in the above—identified patent and that said Letters Patent is hereby corrected as shown below:

Front page, [75] Inventors, after "Maruoka" insert --, Yokohama--; "both of Kawasaki," should be --Kawasaki; both of--.

Col. 1, line 62, delete "the".

Col. 2, line 9, "coontrol" should be --control--.

Col. 5, line 11, after "Data" insert --signal--;

line 12, delete "signal";

line 26, after "representing" insert --the--.

Col. 8, line 16, "acessed" should be --accessed--.

Signed and Sealed this

Twenth-eighth Day of September 1982

[SEAL]

Attest:

GERALD J. MOSSINGHOFF

Attesting Officer    Commissioner of Patents and Trademarks